US008666434B1

(12) United States Patent
Taylor et al.

(10) Patent No.: US 8,666,434 B1
(45) Date of Patent: Mar. 4, 2014

(54) ADAPTIVE LOCATION UPDATING

(71) Applicant: Google Inc., Mountain View, CA (US)

(72) Inventors: Michael James Taylor, Kitchener (CA); Ray Xiaohang Wang, Jersey City, NJ (US); Yakov Okshtein, Far Rockaway, NY (US); Farhan Shamsi, Rego Park, NY (US); Mohammad Hossain Sheikh Attar, Kitchener (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/786,416

(22) Filed: Mar. 5, 2013

(51) Int. Cl.
*H04W 24/00* (2009.01)

(52) U.S. Cl.
USPC .......... 455/456.1; 455/404.2; 455/414.1; 455/440; 455/441; 455/41.2

(58) Field of Classification Search
USPC ........... 455/456.1, 404.2, 414.1, 440, 441, 455/456.2–457, 41.2
See application file for complete search history.

(56) References Cited

U.S. PATENT DOCUMENTS

| 2008/0076451 A1* | 3/2008 | Sheha et al. ............ 455/456.3 |
| 2009/0047972 A1* | 2/2009 | Neeraj ................... 455/456.1 |
| 2012/0100872 A1* | 4/2012 | Alizadeh-Shabdiz et al. ................... 455/456.1 |

* cited by examiner

*Primary Examiner* — Jinsong Hu
*Assistant Examiner* — Michael Nguyen
(74) *Attorney, Agent, or Firm* — Johnson, Marcou & Isaacs, LLC

(57) ABSTRACT

A location of a network user computing device is determined relative to a location of a point of interest. If the user device is determined to be stationary, the user device is monitored for movement, the movement resulting in re-determining the location of the user device relative to a location of the point of interest. If the user device is determined to be moving, the velocity of the user device is matched with a predetermined velocity, and a preliminary estimated time of arrival to the point of interest is determined based on the predetermined velocity matched to the user device. At a later time that is based on a function of the preliminary estimated time of arrival, an estimated time of arrival to the point of interest is verified based on the predetermined velocity matched to the user device.

23 Claims, 7 Drawing Sheets

ADAPTIVE LOCATION UPDATING

TECHNICAL FIELD

The present disclosure relates generally to user device location determination, and more particularly to methods and systems that allow accurate and efficient location determinations of a user device so that the user may receive an alert when the user is near a point of interest.

BACKGROUND

Smartphones and other mobile devices are being used in new ways to streamline interactions between consumers and merchants. Methods of providing advertisements, coupons, payment transactions, and other interactions are changing quickly as mobile device technology improves.

Location data from a mobile device can be used for numerous applications. Many applications use the location data for locating friends, playing games, and assisting a user with directions, for example. The location data can also be used to alert a user when the user and the user's device are in the vicinity of a point of interest, such as a business, an institution, or a location that would be of interest to a user. For example, a user may choose to be alerted every time the user is near a particular store or restaurant, especially if the alert includes a promotional offer for the store or restaurant of interest.

Points of interest are constantly changing. New stores are built, promotions are updated, and the user location changes. Nevertheless, a user may desire constantly updated and accurate point-of-interest information as the user changes location. Unfortunately, providing such updated information to the user requires constant monitoring of the location of the user device. For example, the location based application may need to determine the location of the user and perhaps the movement of the user device continually or every few minutes. This action in turn can adversely affect the device, for example, by draining the battery charge of the device, reducing the data storage capacity of the device, and reducing the required data transmission capacity of the device. And while decreasing the frequency at which the location of the user device is monitored may reduce the adverse affect on battery life, for example, doing so also reduces the accuracy of the point-of-interest information that is presented to the user.

SUMMARY

In certain example aspects described herein, provided is a computer-implemented method for location determination. An adaptive location system determines a location of a network user computing device relative to a location of a point of interest and determines whether the user device is moving or stationary by determining, for example, an average velocity of the user device and determining whether the velocity of the user device is at or below a predetermined minimum threshold. If the adaptive location system determines that the user device is stationary, the adaptive location system associates an assigned velocity with the user device, determines a preliminary estimated time of arrival to the point of interest based at least in part on the assigned velocity associated with the user device, verifies an estimated time of arrival to the point of interest based at least in part on the assigned velocity associated with the user device, the verification resulting in a determination that the user device remains stationary, and monitors for movement of the user device, movement of the user device resulting in re-determining the location of the user device relative to a location of the point of interest. Alternatively, if the adaptive location system determines that the user device is moving, the adaptive location system matches the average velocity of the user device with a predetermined velocity, determines a preliminary estimated time of arrival to the point of interest based at least in part on the predetermined velocity matched to the user device, and verifies at a later time that is based at least in part on a function of the preliminary estimated time of arrival an estimated time of arrival to the point of interest based at least in part on the predetermined velocity matched to the user device.

In another aspect of the example embodiments described herein, an adaptive location system determines whether a network user computing device is moving or stationary. If the An adaptive location system determines that the user device is stationary, the adaptive location system monitors a velocity of the user device based at least in part on: determining a plurality of re-check times that decrease in frequency from a time associated with a previous location check; and, determining a velocity of the user device at each re-check time subsequent to a time associated with a previous location check until the velocity determined at a particular re-check time determines that the user device is moving. In a further aspect of the example embodiments described herein, the adaptive location system monitors whether the user device moves by monitoring Wi-Fi results scans of the user device. The adaptive location system receives a first Wi-Fi results scan from the user device, receives a second Wi-Fi results scan from the user device, and compares the first Wi-Fi results scan with the second Wi-Fi results scan, wherein a change in the Wi-Fi results determines that the user device has moved.

Another aspect of the example embodiments described herein provides a computer program product. The computer program product includes a non-transitory computer-readable storage device having computer-readable program instructions stored therein. The computer-readable program instructions include computer program instructions for: determining a location of a network user computing device relative to a location of a point of interest and determining whether the user device is moving or stationary by determining, for example, an average velocity of the user device and determining whether the velocity of the user device is at or below a predetermined minimum threshold. If the user device is determined to be stationary, the computer program instructions associate an assigned velocity with the user device, determine a preliminary estimated time of arrival to the point of interest based at least in part on the assigned velocity associated with the user device, verify the estimated time of arrival to the point of interest based at least in part on the assigned velocity associated with the user device, the verification resulting in a determination that the user device remains stationary, and monitor the user device for movement, movement of the user device resulting in re-determining the location of the user device relative to a location of the point of interest. Alternatively, if the user device is determined to be moving, the computer program instructions match the average velocity of the user device with a predetermined velocity, determine a preliminary estimated time of arrival to the point of interest based at least in part on the predetermined velocity matched to the user device, and verify at a later time that is based at least in part on a function of the preliminary estimated time of arrival an estimated time of arrival to the point of interest based at least in part on the predetermined velocity matched to the user device.

These and other aspects, objects, features, and advantages of the example embodiments will become apparent to those

DETAILED DESCRIPTION OF EXAMPLE EMBODIMENTS

Overview

Figure 1:
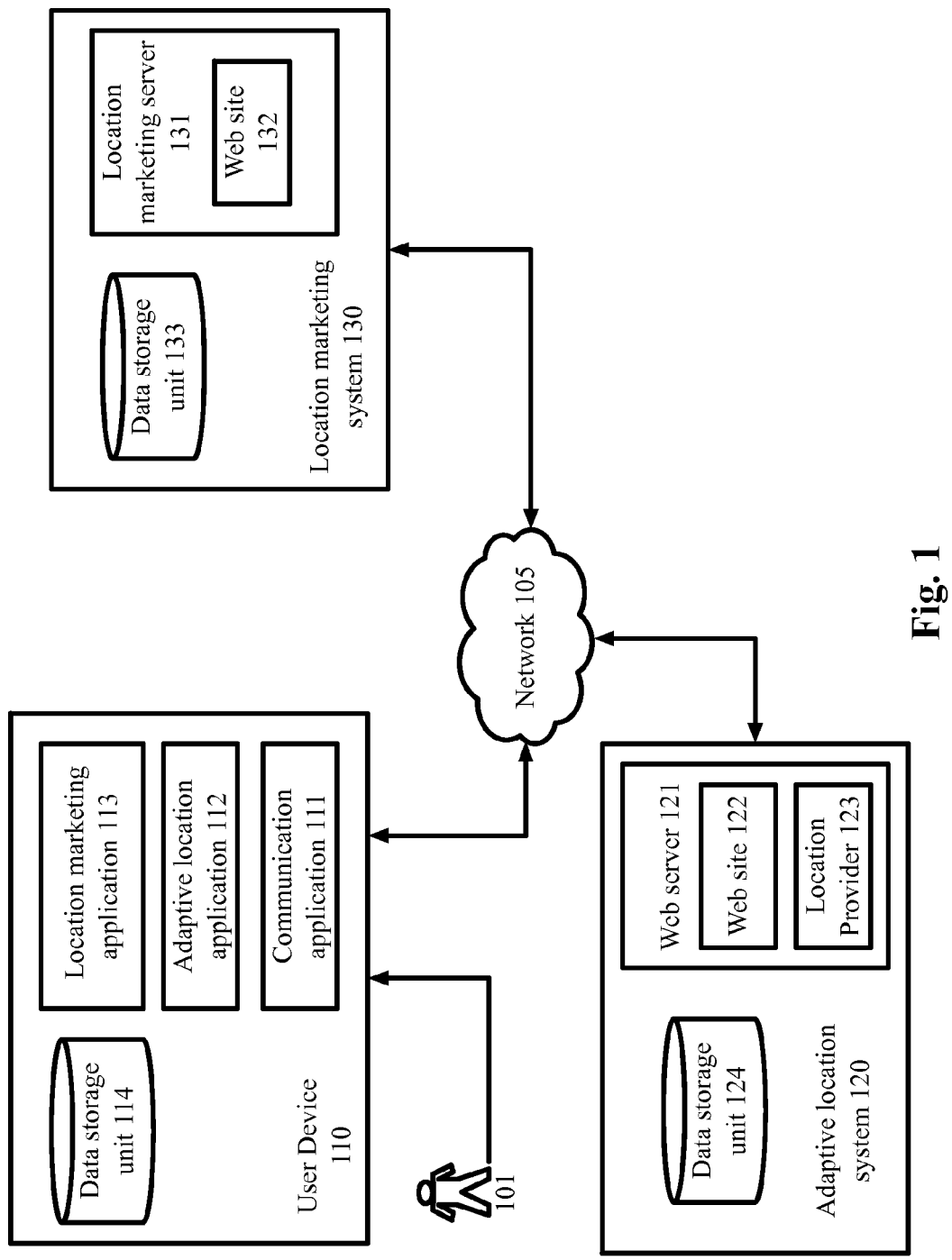
FIG. 1 is a block diagram depicting an adaptive location system, in accordance with certain example embodiments.

The example embodiments described herein provide methods and systems that enable a user device to accurately and efficiently find a user's location so that the user may receive an alert when the user is near a point of interest. In example embodiments, the user must instruct or enable the system or device to engage in the techniques herein. In some embodiments, instructing or enabling the device to perform the techniques herein involves installing an application and/or enabling a feature via a user interface.

By accurately and efficiently finding a user's location, the methods and systems described herein reduce the battery burden that is otherwise associated with both finding the location of a user device and providing alerts to the user when the user is near a particular point of interest.

In certain example embodiments, an adaptive location system (or "ALS") receives a registration from a location marketing system. As part of the registration, the adaptive location system receives location data for points of interest pertinent to the location marketing system's marketing efforts, such as latitude and longitude coordinates for the points of interest. The adaptive location system also receives a specific distance (radius) from the points of interest that defines a zone boundary around each point of interest. The zone boundary operates as an alert zone so that, when the user device is within the zone boundary, an alert is presented to the user regarding the point of interest corresponding to the alert zone. After receiving the registration from the location marketing system, the adaptive location system monitors the user device location, and hence the location of the user, to determine when the user enters an alert zone for a particular point of interest.

To monitor the user device location, the adaptive location system determines the location of the user device relative to the points of interest received as part of the location marketing system registration. If the adaptive location system determines that the user device is currently within an alert zone, the adaptive location system invokes a location marketing application on the user device. The location marketing application on the user device then presents an alert to the user device (and hence the user) regarding the point of interest.

If the user device is not within an alert zone, the adaptive location system determines whether the user device is moving or stationary. For example, the adaptive location system determines the average velocity of the user device. If the average velocity of the user device is zero or about zero, then the adaptive location system determines that the user device is stationary. If the user device velocity is not zero or about zero, the adaptive location system determines that the user device is moving (i.e., the user device is not stationary).

If the adaptive location system determines that the user device is moving, the adaptive location system matches the average velocity of the user device to a predetermined velocity. For example, the velocity of the user device may be matched to a known average speed. In certain embodiments, the predetermined velocity is walking speed or a driving speed, for example. Because actual user device velocities can vary significantly as the user travels with the user device, for example, such matching of the user device velocity to a predetermined velocity allows the adaptive location system to more accurately determine an estimated time of arrival to an alert zone. By comparing the predetermined average velocity with the distance of the user device to the nearby point of interest alert zones, the adaptive location system determines a preliminary estimated time of arrival to one or more alert zones.

The adaptive location system also verifies the preliminary estimated time of arrival to the one or more point of interest alert zones. For example, based on the minimum preliminary estimated time of arrival to the one or more point of interest alert zones, the adaptive location system determines one or more times to re-check the user device velocity based on a fraction of the length of time until the expected arrival to that alert zone. For example, if the adaptive location system determines from the preliminary estimate that the user device should arrive at the alert zone in 6 hours, the adaptive location system may set a re-check time of 3 hours. The adaptive location system also re-determines the user device location and the user device velocity at the re-check time. The adaptive location system then proceeds to again determine whether the user device is stationary or moving based on the most recent user device velocity determination, for example. In certain example embodiments, the adaptive location system may repeat the estimated time of arrival verification multiple times.

If the adaptive location system determines at the re-check time that the user device is moving, the adaptive location system verifies the user device location at the estimated time of arrival to the alert zone. If the user device is within the alert zone at the estimated time of arrival, the adaptive location system invokes the location marketing application on the user device, which in turn presents an alert to the user device regarding the point of interest. If the user device is not within the alert zone, the adaptive location system re-checks the user device location until either the user device enters the alert zone (and the location marketing application is invoked to present the alert) or the adaptive location system determines that the user device is stationary, for example. If at the re-check time the adaptive location system determines that user device is stationary (i.e., the velocity of the user device is zero or about zero), then the method proceeds to assign a predetermined velocity for the user device as described below.

Alternatively, if during the initial determination of the user device velocity the adaptive location system determines that the user device is stationary, the adaptive location system assigns a predetermined velocity to the user device (even though the device was determined to be stationary). Based on the assigned velocity and the distance to one or more point of interest alert zones, the adaptive location system determines a preliminary estimated time of arrival to the alert zones. The adaptive location system then proceeds to verify the preliminary estimated time of arrival to the point of interest alert zones as described above by re-checking the location of the user device and re-determining the velocity of the user device. If the location of the user device is verified to be at or within the alert zone, the adaptive location system invokes the location marketing application on the user device, which in turn presents an alert to the user device regarding the point of interest as described above. If during the verification of the preliminary estimated time of arrival the adaptive location system determines that the user device is moving, then the adaptive location system proceeds to match the velocity of the user device to a predetermined velocity as described above.

If at one or more of the re-check times during the verification of the estimated time of arrival the adaptive location system determines that the user device remains stationary, the adaptive location system monitors whether the user device moves. To monitor whether the user device moves, the adaptive location system relies on one or both of re-checking the user device velocity and using Wi-Fi® scans to detect whether the user device has moved. For example, once the adaptive location system determines that the user device is still stationary, it determines configurable re-check times that decrease in frequency from the time of the previous device location check. In certain embodiments, the adaptive location system determines configurable re-check times that multiplicatively decrease in frequency from the time of the previous device location check. For example, in certain example embodiments, the adaptive location system may determine one or more re-check times based on an exponential back-off from the time of the previous device velocity check, such as at 2, 4, 8, 16, etc. minutes from the time of the previous device velocity check. In certain example embodiments, a configurable limit may be placed on the re-check time, whereby the adaptive location system may be configured to wait not longer than an hour, for example, before checking the average velocity of the user device.

At the one or more re-check times, the adaptive location system determines the average user velocity of the device. If the average velocity is zero or about zero, the adaptive location system determines that the user device remains stationary and then re-checks the average velocity of the device at the next re-check time. The adaptive location system then repeats the re-check cycle until the adaptive location system determines that the user device is not stationary or that the user device has otherwise moved. Once the adaptive location system determines that the user device is not stationary, the adaptive location system proceeds to determine the location of the device and then matches the most recent average device velocity to a predetermined average velocity as described above.

Alternatively or in addition to monitoring the user device velocity, the adaptive location system monitors device movement by monitoring Wi-Fi hotspots available to the user device. For example, whenever new Wi-Fi scan results are available from a device operating system, the adaptive location system will receive those Wi-Fi scan results. The adaptive location system then determines if the user device has changed hotspots (and hence moved) by comparing recent Wi-Fi scan results with previous Wi-Fi scan results. If the adaptive location system determines from the Wi-Fi monitoring that the user device has moved, it will, in certain example embodiments, cease the re-checks of the user device velocity. The adaptive location system then proceeds to determine the location of the device and then matches the most recent average device velocity to a predetermined average velocity as described above.

Example System Architectures

Turning now to the drawings, in which like numerals indicate like (but not necessarily identical) elements throughout the figures, example embodiments are described in detail.

FIG. 1 is a block diagram depicting an adaptive location system, in accordance with certain example embodiments. As depicted in FIG. 1, the exemplary operating environment 100 includes a user network device 110, an adaptive location system 120, and a location marketing system 130 that are configured to communicate with one another via one or more networks 105.

Each network 105 includes a wired or wireless telecommunication means by which network devices (including devices 110, 120, and 130) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network device 110, 120, and 130 includes a device having a communication module capable of transmitting and receiving data over the network 105. For example, each network device 110, 120, and 130 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 120, and 130 are operated by end-users or consumers, location marketing system operators, and loyalty system operators, respectively.

The user 101 can use the communication application 111, such as a web browser application or a stand-alone application, to view, download, upload, or otherwise access documents or web pages via a distributed network 105. The network 105 includes a wired or wireless telecommunication system or device by which network devices (including devices 110, 120, and 130) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer based environment.

The communication application 111 can interact with web servers or other computing devices connected to the network 105, including the location marketing server 131 of the location marketing system 130, the website 132 of the location marketing server, the web server 121 of the adaptive location system 120, the web site 122 of the adaptive location system 120, or the location provider 123 of the adaptive location system 120.

The user device 110 may include an adaptive location application 112 that is configured to interact and communicate with the adaptive location system 120 through the communication application 111. For example, the adaptive location application 112 can be used and configured to send device location data to the location provider 123 of the adaptive location system 120.

The user device may also include a location marketing application 113 that is configured to interact and communicate with both the adaptive location application 112 of the user device 110 and the location marketing system 130 via the network 105. For example, the location marketing application 113 is configured to receive location updates from the adaptive location application 112 and/or the adaptive location system 120. The location marketing application 113 is also configured to receive alert content from the location marketing service 130, such as coupons, specials offers, or other items related to the marketing efforts of the location marketing system 130. Examples of location marketing applications 113 that may use the location data from the adaptive location application 111 may include, for example, Global Positioning System ("GPS") location technology or other location identifying technology of the user device, business finder applications, location-based social networks, location-based gaming, or friend locater application.

The user device 110 includes a data storage unit 114 that is accessible by the communication application 111, the adaptive location application 112, and the location marketing application. In certain embodiments, for example, the data storage unit 114 stores data regarding the location of the device and Wi-Fi hotspots that are or have been available to the user device 110. The exemplary data storage unit 114 can include one or more tangible computer-readable media. The data storage unit 114 can be stored on the user device 110 or can be logically coupled to the user device 110. For example, the data storage unit 114 can include on-board flash memory and/or one or more removable memory cards or removable flash memory.

The adaptive location system 120 may, in certain embodiments, execute and operate independently of the adaptive location application 112. Additionally and alternatively, the adaptive location system 120 may execute within the adaptive location application 112 of the user device 110 or it may execute and operate as a companion application to the adaptive location application 112 on the user device 110. The adaptive location system 120 uses a location provider 123 that determines the location of the user device 110 based on, for example, location data received from the adaptive location application 112. The location provider may rely on Global Positioning System ("GPS") location technology, a Network Location Provider ("NLP"), a map application, or other location identifying technology of the user device 110 to determine the user device location. Additionally or alternately, the user device 110 may be capable of providing location data, for example, directly from the host CPU (not shown). The host CPU may provide the location data to either the adaptive location application 112 of the user device 110 or to the location provider 123 of the adaptive location system 120.

The adaptive location system 120 can also be used and configured to receive point-of-interest location data from the location marketing system 130 via the network 105 and then store those data. The adaptive location system 120 includes a data storage unit 124 that is accessible by the adaptive location application 112. In certain embodiments, for example, the data storage unit 124 stores data regarding the location of the device and Wi-Fi hotspots that are or have been available to the user device 110. The data storage unit 124 may also store information received from the location marketing system 130 regarding the location of points of interest, as well as information regarding defined zone boundaries around the points of interest. The exemplary data storage unit 124 can include one or more tangible computer-readable media. The data storage unit 124 can be stored on the user device 110 or can be logically coupled to the user device 110. For example, the data storage unit 124 can include on-board flash memory and/or one or more removable memory cards or removable flash memory.

The location marketing system 130 uses a location marketing server 131. The location marketing system server 131 may represent the computer-implemented system that the location marketing system 130 employs to provide point-of-interest location information to the adaptive location system 120. The location marketing system server 131 may also represent the computer-implemented system that generates alert content for the location marketing application 113 of the user device. In certain example embodiments, the location marketing system 130 may represent any number of systems that may be polled by the adaptive location system to gather point-of-interest location information. For example, the location marketing system 130 may be the marketing system of a product manufacturer or a service provider. The location marketing system 130 may be a social network system of a user that can provide preferences and historical data of a user's activities. The location marketing system 130 may be a coupon aggregator or provider. The location marketing system 130 may also be a mapping program. The location marketing system 130 may be any other service or system that may provide information that the adaptive location system 120 can use to define the location of a point-of-interest.

The location marketing system 130 can communicate with the adaptive location system 120 or the user device 110 via any available technologies. These technologies may include, but would not be limited to, an Internet connection via the network 105, email, text, instant messaging, or other suitable communication technologies. The location marketing system 130 may include a data storage unit 133 accessible by the server 131 of the location marketing system 130. The data storage unit 133 can include one or more tangible computer-readable storage devices.

It will be appreciated that the network connections shown are exemplary and other means of establishing a communications link between the computers and devices can be used. Moreover, those having ordinary skill in the art having the benefit of the present disclosure will appreciate that the user device 110, the adaptive location system 120, and the location marketing system 130 illustrated in FIG. 1 can have any of several other suitable computer system configurations. For example, a user device 110 embodied as a mobile phone or handheld computer may not include all the components described above.

Example System Processes

Figure 2:
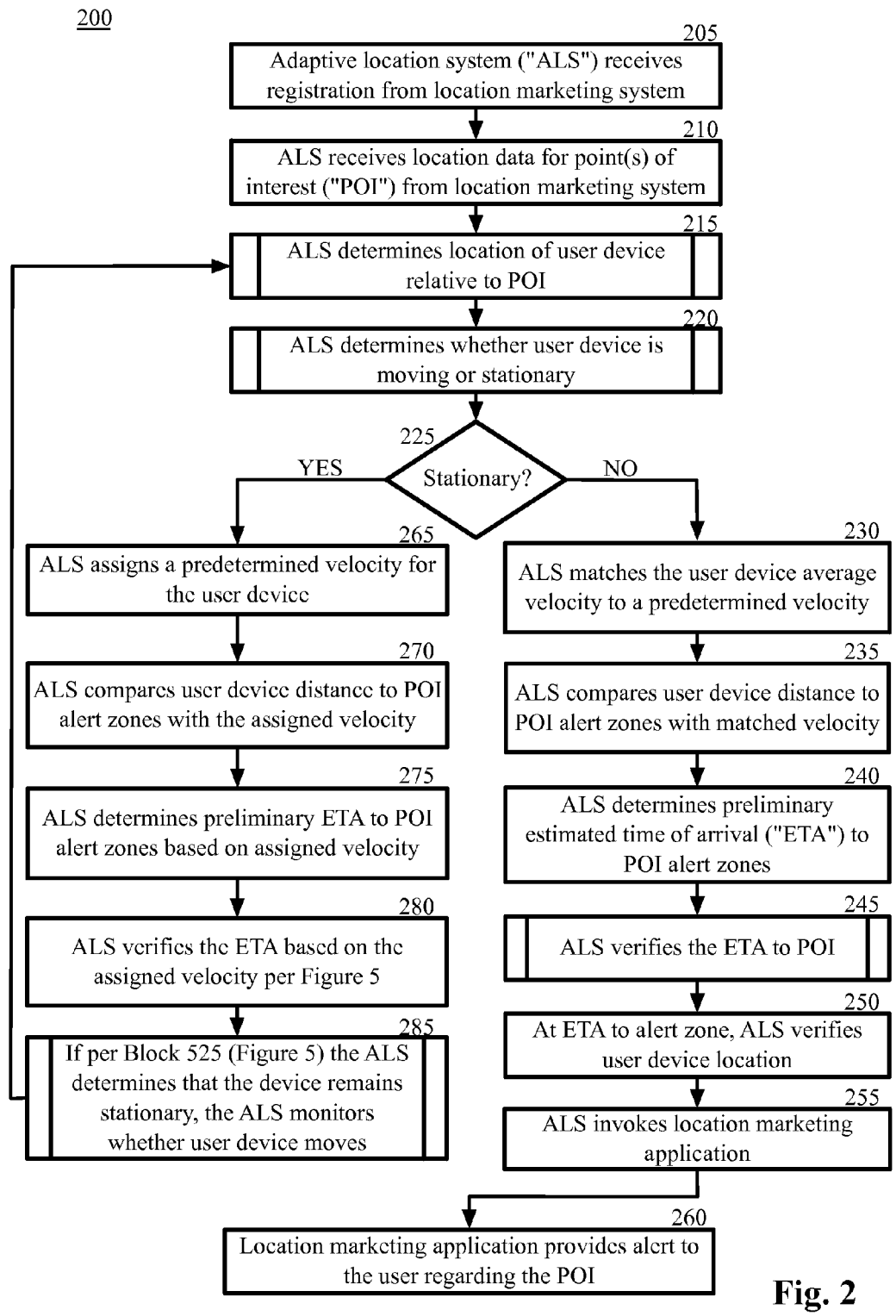
FIG. 2 is a block flow diagram depicting a method for adaptively locating a user device, in accordance with certain example embodiments.

The example methods illustrated in FIG. 2 are described hereinafter with respect to the components of the example operating environment 100. The example methods of FIG. 2 may also be performed with other systems and in other environments.

FIG. 2 a block flow diagram depicting a method for adaptively locating a user device, in accordance with certain example embodiments.

With reference to FIGS. 1 and 2, in block 205, an adaptive location system 120 receives a registration from a location marketing system 130. As part of the registration, for example, the location marketing system 130 may provide context information for use by the adaptive location system 120, such the number of locations it intends the adaptive location system 120 monitor and, in certain example embodiments, information regarding whether the monitoring will be local, regional, national or global. The location marketing system 130 may also provide computer-readable programming instructions and/or source code to facilitate communication and integration between the location marketing application 113 and the adaptive location application 112 on the user device 110. That is, the location marketing system 130 may provide programming instructions and/or source code that allows the adaptive location application 112 to invoke the location marketing application 113 so that the location marketing application 113 can present the pertinent alert to the user device 110 and hence to the user 101.

The location marketing system 130 also determines the location data for each of the specific points of interest that it intends to have the adaptive location system 120 monitor. For example, the location marketing system 130 may determine the latitude and longitude coordinates of each point of interest. Additionally or alternatively, the location marketing system 130 may determine any other suitable location data for points of interest, such as the street address for each point of interest or the Ordnance Survey Grid Reference information. In certain example embodiments, the adaptive location system 120 may convert such location data to latitude and longitude coordinates.

The location marketing system 130 also determines the distance a user device 110 should be to each point of interest before the adaptive location system 120 notifies the location marketing application that a given point of interest is nearby. For example, the location marketing system 130 may determine and define a zone boundary around a particular point of interest, such as a configured radius around a particular point of interest. Alternatively, the location marketing system 130 may generally define a zone boundary, such as a configured radius, that is the same for all of the points of interest. In an example embodiment, the user may, via the network 105 and the website 132 of the location marketing system 130, determine a configured range of the point of interest, such as within a block of the point of interest.

The zone boundary functions and operates as an alert zone so that, when the user device 110 is at or within the zone boundary, the adaptive location application 112, for example, can invoke the location marketing application 113. The location marketing application 113 then presents the pertinent alert to the user device 110 (and hence to the user 101) regarding the point of interest. In certain embodiments, the location marketing system 130 may determine that the radius of the zone boundary is zero, such that the alert zone exists only when the user 101 is at the point of interest. That is, in some embodiments, the alert zone and the point of interest may be one in the same.

In block 210, the adaptive location system 120 receives the location data from the location marketing system 130. For example, the adaptive location system 120 receives the latitude and longitude coordinates from the location marketing system 130, as well as the zone boundary information defining the alert zone for one or more of the points of interest. In certain example embodiments, the adaptive location system 120 may store the location data in the data storage unit 124.

In block 215, the adaptive location system 120 determines the location of the user device 110 relative to the points of interest received from the location marketing system 130. This includes, for example, determining the distance of the user device to the nearby point of interest alert zones and determining whether the user device 110 is already at or within an alert zone. If the adaptive location system 120 determines that the user device 110 is already at or within an alert zone, the method follows to block 255, wherein the adaptive location application 112, for example, invokes the location marketing application 113 on the user device. The details of block 210 are described in further detail below with reference to FIG. 3.

In block 220, the adaptive location system 120 determines whether the user device 110 is moving or stationary. This includes, for example, determining an average velocity of the user device 110 based on serial location measurements of the user device 110 and, for example, determining whether the velocity of the user device is at or below a predetermined minimum threshold. If the velocity of the user device 110 is zero or about zero, such less than about 1.0 meter/second, the adaptive location system 120 determines that the user device 110 is stationary, and the method 220 follows the "YES" branch of block 225 to block 265. As will be appreciated by those skilled in the art, a drift associated with the location may exist (and be known). For example, the drift location associated with a GPS device like the user device 110 in certain embodiments may be 2 kilometers per hour. Therefore, a velocity of less than 2 kilometers per hour may be considered "about zero." Further, the drift in GPS location may be localized (e.g., greater drift may be associated with urban areas with taller buildings) and therefore the "about zero" velocity may vary based on relative location of the user device. If the adaptive location system 120 determines that the velocity of the user device 110 is not zero or about zero, the adaptive location system 120 determines that the user device 110 is moving (i.e., not stationary), and the method follows the "NO" branch of block 225 to block 230. The details of block 220 are described in further detail below with reference to FIG. 4.

Once the adaptive location system 120 determines that the user device 110 is moving as described above, in block 230 the adaptive location system 120 matches the average velocity of the user device 110, as determined in block 220, to a predetermined velocity. For example, if the average velocity of the user device 110 roughly approximates the average walking velocity of a user, the adaptive location system 120 matches the user device 101 velocity to a predetermined average velocity for walking. That is, in certain example embodiments, if the determined average velocity of the user device is slow, such as about 1.0 meters/second, for example, the adaptive location system 120 matches a predetermined velocity of about 1.38 meters/second to the user device 110. Similarly, if the adaptive location system 120 determines that the average velocity of the user device is 4.0 meters/second, for example, the adaptive location system 120 matches a predetermined velocity of about 1.38 meters/second to the user device 110.

Alternatively, if for example the adaptive location system 120 determines that the average velocity of the user device 110 is much faster than an average walking speed, the adaptive location system 120 matches a faster speed, such as an average driving speed, to the user device 110. That is, if the average velocity of the user device 110 is greater than about 5 meters/second, the adaptive location system 120 matches an average driving speed of 33 meters/second to the user device 110.

Because actual user device 110 velocities can vary significantly as the user 101 travels with the user device, for example, such matching of the user device 110 velocity to a predetermined velocity allows the adaptive location system 120 to more accurately determine an estimated time of arrival to an alert zone.

While average walking and driving speeds vary, an average walking speed may, for example, be about 1.0, 1.1, 1.2, 1.3, 1.4, 1.5, 1.6, 1.7, 1.8, 1.9, 2.0, 2.1, 2.2, 2.3, 2.4, or 2.5 meters/second or values there between. An average driving speed may, for example, be about 25, 26, 27, 28, 29, 30, 31, 32, 33, 34, 35, 36, 37, 38, 39, 40, 41, 42, 43, 44, or 45 meters/second or values there between. Depending on the accuracy of the location data from the location marketing system 130 and the location determination accuracy of the location provider 123, for example, the predetermined velocity that the adaptive location system 120 matches to the user device is configurable to account for any inaccuracies of the location data. In certain example embodiments, the adaptive location system 120 may match other predetermined velocities, such as an average running velocity or average bicycling velocity, to the user device to, for example, increase the accuracy of the location determination described herein.

In block 235, the adaptive location system 120 compares the distance of the user device 110 to a point of interest alert zone with the matched velocity determined as described above with reference to block 230. For example, if the distance of the user device 110 to a nearby point of interest alert zone is 1000 meters and the matched velocity from block 230 is 1.38 meters/second, the adaptive location system 120 compares the 1000 meters to the matched 1.38 meters/second velocity.

In block 240, the adaptive location system 120 determines a preliminary estimated time of arrival to the to the point of interest alert zone based on the comparison of the distance of the user device 110 to the point of interest alert zone with the matched velocity. That is, the adaptive location system 120 determines a preliminary estimated time of arrival to the point of interest alert zone as a function of the distance of the user device 110 to a nearby point of interest alert zone and the matched velocity. For example, if the distance of the user device 110 to the point of interest alert zone is 1000 meters and the matched velocity from block 230 is 1.38 meters/second, then the length of time to arrival is about 725 seconds or about 12 minutes. Continuing with this example, the adaptive location system 120 would determine that the estimated time of arrival would be in about 12 minutes from the time of the preliminary estimated time of arrival determination. That is, if the adaptive location system 120 made the preliminary estimated time of arrival determination at 4:00 p.m., the estimated time of arrival would be 4:12 p.m. (continuing the example).

In block 245, the adaptive location system 120 verifies the preliminary estimated time of arrival. For example, the adaptive location system 120 determines one or more re-check times to re-check the location and velocity of the user device. In certain embodiments, when the device is moving the adaptive location system 120 re-checks the average velocity of the user device 110 and determines a secondary preliminary estimated time of arrival. The method then follows to block 250. In certain embodiments, the adaptive location system 120 will repeat this verification step one or more times before proceeding to block 250. The details of block 245 are described in further detail below with reference to FIG. 5.

In block 250, the adaptive location system 120 verifies the location of the user device 110 relative to the alert zone. For example, the adaptive location system 120 determines the latitudinal and longitudinal coordinates of the user device 110 such as by using the location provider 123 of the adaptive location system 120. The adaptive location system 120 then compares the location of the device to the point of interest alert zone data from the location marketing system 130, for example. The adaptive location system 120 then determines whether the user device 110 (and hence the user 101) is at or within the alert zone. If the adaptive location system 120 determines that the user device 110 is at or within the alert zone, the method follows to block 255. If the user device 110 is not at or within the alert zone, the adaptive location system 120 may, in certain example embodiments, re-checks the user device 110 location until either the user device 110 enters the alert zone or the adaptive location system determines that the user device is stationary. For example, in certain embodiments, if the user device 110 is not at or within the alert zone at the estimated time of arrival, the adaptive location system 120 may place a configurable limit on the number of times the adaptive location system 120 re-checks the location of the user device. If the adaptive location system 120 determines that the limit of re-check times has been met but that the user device 110 remains beyond the alert zone, for example, the method follows to block 220.

In block 255, the adaptive location system 120 invokes the location marketing application 113 on the user device. For example, in certain example embodiments, the adaptive location system 120 may notify the adaptive location application 112 on the user device 110 that the user device 110 has, based on the estimated time of arrival, arrived at the point of interest alert zone. The adaptive location application 112 may then notify the location marketing application 113 that the user device is near a point of interest or approaching the point of interest. In certain embodiments, at the estimated time of arrival the adaptive location application 112 provides location information to the location marketing application 113 so that the location marketing application 113 can determine configured alert content specific to the point of interest. In certain other embodiments, at the estimated time of arrival the adaptive location application 112 triggers execution of the location marketing application 113. The location marketing application 113 may then make a location determination, a point of interest determination, and an alert content determination, for example, using computer-readable programming instructions and/or source code native to the location marketing application 113.

In block 260, the location marketing application 113 presents an alert to the user 101 using any configurable alerting procedure. For example, the alert may take any configured form desired by the user. In certain exemplary embodiments, the location marketing application 113 may use the alert internally or may provide an audible alert, a vibration, or a visible alert. For example, the location marketing application 113 may present point-of-interest details on the display of the user device 110 such as on a map or in e-mail. The location marketing application 113 may also rely on any other configurable alerting procedure, such as sending an email, a push notification, a text message, or another communication to the user 101. The location marketing application 113 may also store the alert for later user.

As noted above, if the adaptive location system 120 determines per block 220 that the user device 110 is stationary, the method follows the "YES" branch of block 225 to block 265. In block 265, the adaptive location system 120 assigns a predetermined velocity for the user device 110 (even though the adaptive location system 120 determined that the user device 110 was stationary). For example, the adaptive location system 120 assigns a velocity to the user device 110 that corresponds with a slow velocity such as an average walking speed. In certain embodiments, the assigned velocity may be 1.0, 1.1, 1.2, 1.3, 1.4, 1.5, 1.6, 1.7, 1.8, 1.9, 2.0, 2.1, 2.2, 2.3, 2.4, or 2.5 meters/second or values there between, for example.

In block 270, the adaptive location system 120 compares the distance of the user device 110 to a nearby point of interest alert zone with the assigned velocity determined as described above with reference to block 265. For example, if the distance of the user device 110 to a nearby point of interest alert zone is 1000 meters and the assigned velocity from block 230 is 1.38 meters/second, the adaptive location system 120 compares the 1000 meters to the assigned 1.38 meters/second velocity.

In block 275, the adaptive location system 120 determines a preliminary estimated time of arrival to the to the point of interest alert zone based on the comparison of the distance of the user device 110 to the nearby point of interest alert zone with the assigned velocity. That is, the adaptive location system 120 determines a preliminary estimated time of arrival to the to the point of interest alert zone as a function of the distance of the user device 110 to the nearby point of interest alert zone and the assigned velocity. For example, if the distance of the user device 110 to the nearby point of interest alert zone is 1000 meters and the assigned velocity from block 230 is 1.38 meters/second, then the length of time to arrival is about 725 seconds or about 12 minutes. Continuing with this example, the adaptive location system 120 would determine that the estimated time of arrival to be in about 12 minutes from the time of the preliminary estimated time of arrival determination. That is, if the adaptive location system 120 made the preliminary estimated time of arrival determination at 4:00 p.m., the estimated time of arrival would be 4:12 p.m. (continuing the example).

In block 280, the adaptive location system 120 verifies the preliminary ETA based on the assigned velocity (per FIG. 5, discussed below). For example, the adaptive location system 120 re-checks the location of the user device and the average velocity of the user device 110. If the user device is moving, the adaptive location system 120 determines a secondary preliminary estimated time of arrival and the method follows to block 250.

As part of the verification method discussed in the details of FIG. 5 (below), the adaptive location system 120 re-checks the velocity of the user device 110 and determines whether the user device 110 is stationary or moving per block 525. If per block 525 the adaptive location system 120 determines that the user device remains stationary the re-check time, then the method follows to block 285. That is, if after initially determining that the user device is stationary per block 220 and following the "YES" branch of block 225 the adaptive location system 120 determines in block 525 that the user device remains stationary, then the method follows to block 285.

In block 285, if the user device 110 remains stationary per block 525 (of FIG. 5), the adaptive location system 120 monitors whether the user device moves. The details of block 285 are described in further detail below with reference to FIG. 6. When per block 285 the adaptive location system 120 determines that the user device 110 moves, then the method follows back to block 215.

The method 200 continues until the adaptive location system 120 invokes the location marketing application 113, for example, and the location marketing application 113 presents an alert to the user 101 regarding the point of interest.

Figure 3:
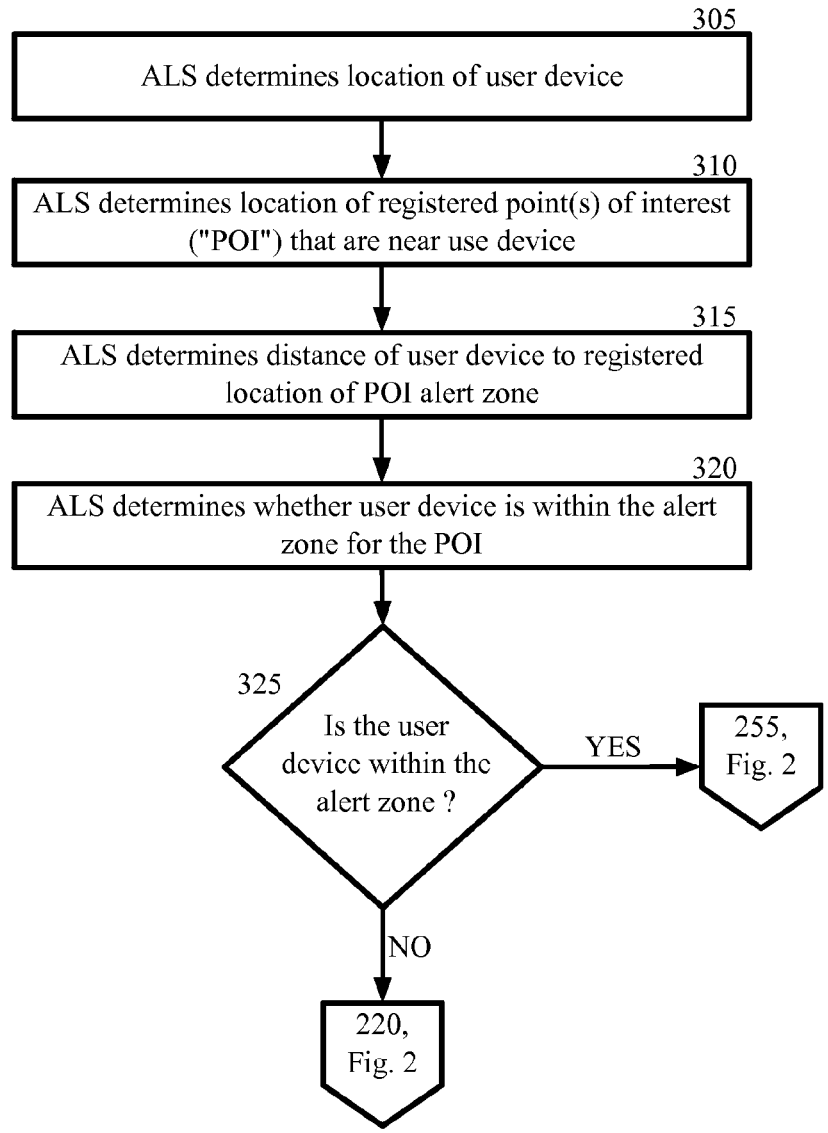
FIG. 3 is a block flow diagram depicting a method for determining the location of a user device relative to one or more points of interest, in accordance with certain example embodiments.

FIG. 3 is a block flow diagram depicting a method for determining the location of a user device 110 relative to one or more points of interest, in accordance with certain example embodiments.

With reference to FIGS. 1 and 2, in block 305 of method 215, the adaptive location system 120 determines the location of the user device 110. For example, the adaptive location system 120 determines the latitudinal and longitudinal coordinates of the user device 110, such as by using the location provider 123 of the adaptive location system 120.

In block 310, the adaptive location system 120 determines the location of registered points of interest that are near the user device 110. For example, the adaptive location system 120 compares the latitude and longitude coordinates of the user device 110 with the latitude and longitude coordinates for points of interest that the adaptive location system 120 received from the location marketing system 130. In some embodiments, to make this comparison the adaptive location system retrieves the latitude and longitude coordinates for points of interest from the data storage unit 124, for example. In other embodiments (not shown), the adaptive location system 120 may provide the latitude and longitude coordinates of the user device 110 to the location marketing system 130. Based on the latitude and longitude coordinates of the user device 110, the location marketing system 130 may return nearby points of interest to the adaptive location system 120.

Near or nearby points of interest, for example, may be points of interest that are within a configurable radius around the user device. For example, the location marketing system 130 may, during the registration with the adaptive location system 120, establish that near or nearby points of interest are those points of interest that are within a 10 kilometer radius of the user device. In certain other embodiments, a point of interest may be near or nearby if the point of interest and the user device 110 reside within a geographical region that, for example, the location marketing system 130 configures. For example, the location marketing system 130 may determine that a near or nearby region is the various latitude and longitude coordinates encompassing a particular city. In certain other embodiments, such as when only the adaptive location system receives only a limited number of points of interest from the location marketing system 130, the adaptive location system may treat all the points of interest as near or nearby.

In block 315, the adaptive location system 120 determines the distance of the user device 110 to the point of interest alert zones that are registered with the adaptive location system 120. For example, based on the comparison of the latitude and longitude coordinates of the user device 110 with the latitude and longitude coordinates for the nearby points of interest, along with any configured radius around the point of interest, the adaptive location system 120 determines the distance of the user device 110 to the nearby point of interest alert zones. That is, the distance of the user device 110 to one or more point of interest alert zones is a function of the comparison of the user device location (i.e., latitude and longitude coordinates of the user device 110) with the location of the alert zone boundary (i.e., latitude and longitude coordinates of the point of interest as expanded by the radius around the point of interest defining the alert zone, for example).

In block 320, the adaptive location system 120 determines whether the user device is at or within an alert zone. For example, if the user device is at or within the configured radius around the point of interest, the adaptive location system 120 determines that the user device 110 is at or within the alert zone. Alternatively, the adaptive location system 120 may determine that the user device 110 is at or within the alert zone if the configured radius around the user device 110 meets or overlaps with the zone boundary of the alert zone, for example. If the adaptive location system 120 determines that the user device 110 is at or within an alert zone, the method follows the "YES" branch of block 325 directly to block 255.

If the adaptive location system 120 determines that the user device 110 is not at or within an alert zone, the method follows the "NO" branch of block 325 directly block 220.

Figure 4:
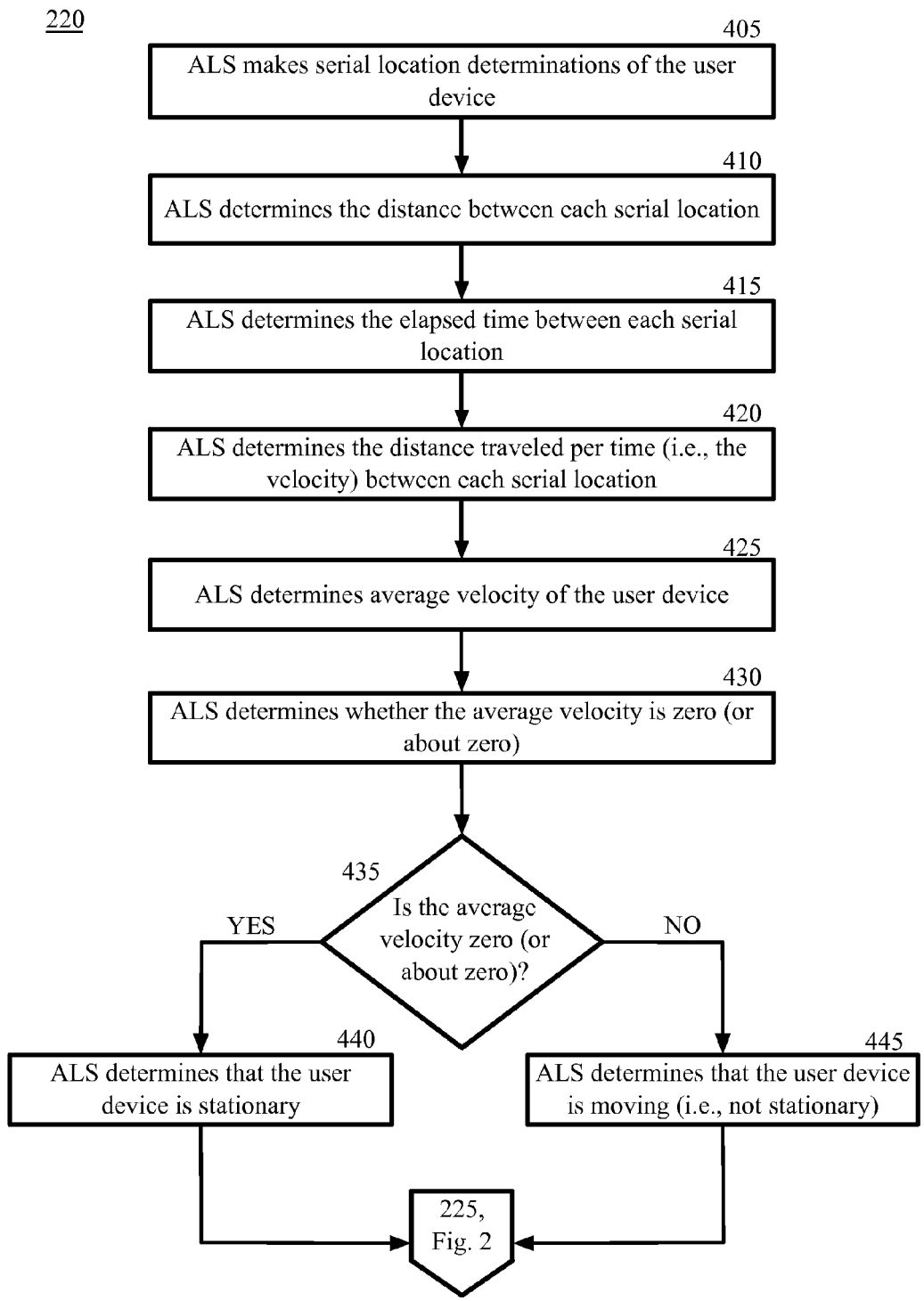
FIG. 4 is a block flow diagram depicting a method for determining whether a user device is moving or stationary, in accordance with certain example embodiments.

FIG. 4 is a block flow diagram depicting a method for determining whether a user device is moving or stationary, in accordance with certain example embodiments.

With reference to FIGS. 1 and 2, in block 405 of method 220, the adaptive location system 120 makes serial location determinations of the user device. For example, the adaptive location system 120 serially determines the latitudinal and longitudinal coordinates of the user device 110 at different points in time such as by using the location provider 123 of the adaptive location system 120. That is, in certain example embodiments, the adaptive location system 120, in conjunction with the location provider 123, may make 2, 3, 4, 5, 6, 7, 9, 10 or more locations determinations in a row, while monitoring the latitude and longitude coordinates of the user device 110 at each location determination. The adaptive location system 120 also determines and stores, for example, the time at which each location determination was made.

In block 410, the adaptive location system 120 determines the distance between each serial location determination of the user device. For example, the distance between each serial location determination corresponds to the displacement of the user device 110 between each serial location. The distance between each serial location is, for example, a function of the displacement of the user device 110 between the location at one location determination to the location of the user device at the next location determination.

In block 415, the adaptive location system 120 determines the elapsed time between each serial location. For example, as noted above the adaptive location system determines the time at which each location determination was made. Based on these time determinations, the adaptive location system 120 determines the time that elapses as the user device 110 moves between each serial location. For example, the adaptive location system 120, in conjunction with the location provider 124, may make the serial locations determinations every 15 seconds, with 15 seconds being the elapsed time between each serial location determination. In certain embodiments, the time between each serial location determination may vary.

In block 420, the adaptive location system 120 determines the distance the user device traveled per time between the serial locations. That is, the adaptive location system 120 determines the velocity of the user device 110 between each serial location. For example, if the displacement of the user device 110 from a first location determination to a second location determination is 150 meters, and the elapsed time between the two location determinations is 15 seconds, the adaptive location system 120 determines that the velocity of the user device 110 is 15 meters/second. That is, the velocity of the user device between each serial location is a function of the distance the user device 110 travels per the elapsed time traveled.

In block 425, the adaptive location system 120 determines the average velocity of the user device 110. For example, the adaptive location system 120 determines the sum of the user device velocities between each serial location and then divides the total velocity by the number of serial location determinations. In other embodiments, for example, the adaptive location system 120 may rely on the median velocity of the user device among the serial locations.

In block 430, the adaptive location system 120 determines whether the average velocity of the user device 110 is zero or about zero. For example, if the adaptive location system 120 determines that the average velocity of the user device 110 is between 0 and about 0.5 meters/second, the adaptive location system 120 will determine that the velocity of the user device 110 is zero or about zero. Alternatively, if the adaptive location system 120 determines that the average velocity of the user device 110 is greater than about 0.5 meters/second, the adaptive location system 120 will determine that the user device 110 not zero or about zero. It will be appreciated that these values are exemplary and that, depending on the accuracy of the location determinations, which may fluctuate depending on the location provider 123, these values may be configurable by the adaptive location system 120, for example.

If the adaptive location system 120 determines that the velocity of the user device 110 is zero or about zero, the method follows from block 430 through the "YES" branch of block 435 to block 440. If the adaptive location system 120 determines that the velocity of the user device 110 is not zero or about zero, the method follows from block 430 through the "NO" branch of block 435 to block 445.

In block 440, the adaptive location system determines that the user device is stationary. For example, the adaptive location system 120 determines that an average velocity of the user device 110 of zero or about zero establishes that the user device 110 is stationary.

In block 445, the adaptive location system determines that the user device is moving. For example, the adaptive location system 120 determines that an average velocity of the user device 110 greater than zero or about zero establishes that the user device 110 is moving (i.e., not stationary).

Figure 5:
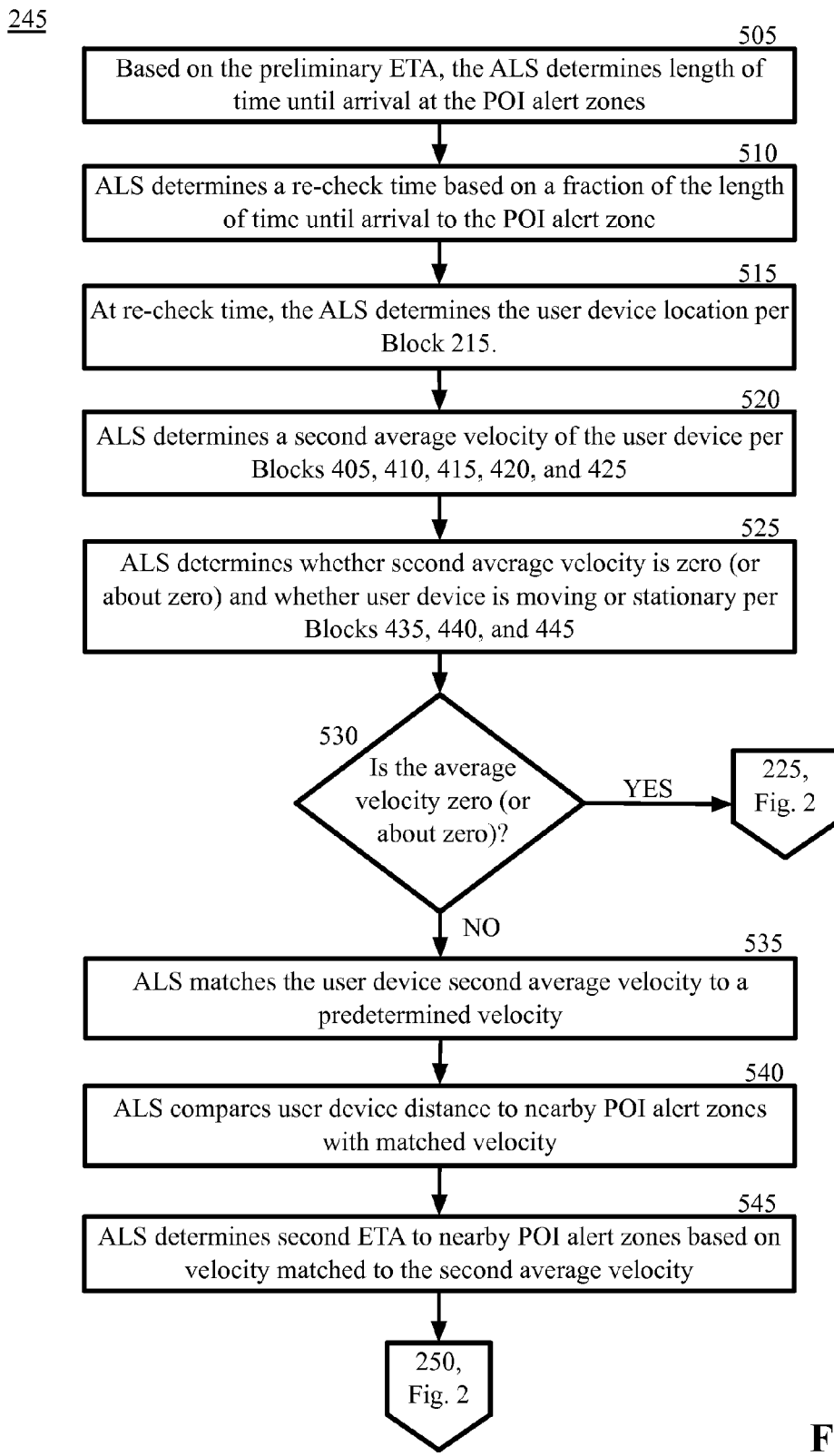
FIG. 5 is a block flow diagram depicting a method for verifying an estimated time of arrival to a point of interest, in accordance with certain example embodiments.

FIG. 5 is a block flow diagram depicting a method for verifying an estimated time of arrival to a point of interest, in accordance with certain example embodiments.

With reference to FIGS. 1 and 2, in block 505 of method 245, the adaptive location system 120 determines the length of time until arrival at nearby point of interest alert zones. For example, as part of determination of the preliminary estimated time of arrival, the adaptive location system 120 determines the length of time until the device is determined to arrive at a point of interest alert zone. That is, the length of time to the point of interest alert zone is based on the preliminary estimated time of arrival, which the adaptive location system 120 determines as described above.

In block 510, the adaptive location system 120 determines one or more configurable re-check times based on a fraction of length of time until arrival at a point of interest alert zone. For example, if the adaptive location system 120 determines from the preliminary estimated time of arrival that the user device 110 should arrive at an alert zone in 6 hours, the adaptive location system may set a re-check time of 3 hours and 1.5 hours. In certain example embodiments, the number of re-check times may be a function of the length of time until the estimated time of arrival to the point of interest alert zone. That is, the longer the length of time until arrival at the nearby point of interest zone, the more re-check times the adaptive location system 120 may determine. In certain embodiments, the re-check time is based on the minimum estimated time of arrival among several preliminary estimated times of arrival, for example. That is, the initial re-check time is determined based off of the minimally determined estimated time of arrival. Additionally or alternatively, the adaptive location system 120 may set re-check times that increase in number as the estimated time of arrival to the point of interest approaches. For example, if the adaptive location system 120 determines from the preliminary estimated time of arrival that the user device 110 should arrive at the alert zone in 6 hours, the adaptive location system may set a re-check time of 3, 1.5 hours, 45 minutes, 20 minutes, 10 minutes, 5 minutes, and 2 minutes. Likewise, if the adaptive location system 120 determines from the preliminary estimated time of arrival that the user device 110 should arrive at the alert zone in about 12 min, the adaptive location system 120 may determine re-check times of 6 minutes, 3 minutes, and 1.5 minutes.

In block 515, at a re-check time the adaptive location system 120 determines the location of the user device 110 as detailed in block 215. That is, at the one or more re-check times, the adaptive location system 120 determines the location of the user device 110.

In block 520, the adaptive location system 120 re-checks a second average velocity of the device at the re-check time. For example, the adaptive location system 120 relies on the method described above for blocks 405, 410, 515, 420, and 425 to again determine the average velocity of the user device. Because continuously checking a user device location and/or velocity at repeated intervals (such as every 5 minutes, for example) is battery intensive, re-checking the user device average velocity at specified re-check times (rather than continuously, for example) is less battery intensive and hence preserves battery charge.

In block 525, the adaptive location system 120 determines whether the second average velocity is zero (or about zero) and whether user device is moving or stationary per blocks 435, 440, and 445. Alternatively, if at a subsequent re-check time the adaptive location system 120 has determined a more recent average velocity of the user's device 110, the adaptive location system 120 determines whether that velocity is zero (or about zero) and whether the device is moving or stationary per blocks 435, 440, and 445. For example, if the adaptive location system 120 determines a third average velocity in block 520 then the adaptive location system 120 will rely on that third average velocity to determine whether the average velocity is zero or about zero and whether the device is moving or stationary per blocks 435, 440, and 445. That is, in block 525, the adaptive location system 120 relies on the most recent average velocity determination. In certain example embodiments, the method follows to block 225.

If the adaptive location system 120 determines that the velocity of the user device 110 is zero or about zero, then the method follows the "YES" branch of block 530 to block 225 (FIG. 2) as discussed herein. If the adaptive location system 120 determines that the velocity of the user device 110 is not zero or about zero, then the method follows the "NO" branch of block 530 to block 225 (FIG. 2) as discussed herein to block 535.

In block 535, the adaptive location system matches the average velocity of the user device 110 to a predetermined velocity. For example, if the second average velocity of the user device 110 roughly approximates the average walking velocity of a user, the adaptive location system 120 matches the user device 101 velocity to a predetermined average velocity for walking as described above. Alternatively, if for example the adaptive location system 120 determines that the second average velocity of the user device 110 is much faster than an average walking speed, the adaptive location system 120 matches a faster speed, such as an average driving speed, to the user device 110 as described above.

In block 540, the adaptive location system 120 compares the distance of the user device 110 to the nearby point of interest alert zones with the matched velocity determined as described above with reference to block 520. For example, if the distance of the user device 110 to a nearby point of interest alert zone is 500 meters and the matched velocity from block 535 is 1.38 meters/second, the adaptive location system 120 compares the 500 meters to the matched 1.38 meters/second velocity.

In block 545, the adaptive location system 120 determines a secondary estimated time of arrival to a nearby POI alert zone based on the velocity matched to the second average velocity. That is, the adaptive location system 120 determines a secondary estimated time of arrival to the to the point of interest alert zone as a function of the distance of the user device 110 to the nearby point of interest alert zone and the matched velocity. For example, if the distance of the user device 110 to the nearby point of interest alert zone is 500 meters and the matched velocity from block 520 is 1.38 meters/second, then the length of time to arrival is about 362 seconds or about 6 minutes. Continuing with this example, the adaptive location system 120 would determine that the secondary estimated time of arrival would be in about 6 minutes from the time of the preliminary estimated time of arrival determination. If the adaptive location system 120 made the secondary estimated time of arrival determination at 4:06 p.m., the estimated time of arrival would be 4:12 p.m. (continuing the example).

As will be appreciated, the level of accuracy of the estimated times of arrival described herein is configurable. For example, if a point of interest is the only location within a geographical area such as a city, a less accurate estimated time of arrival, preliminary or otherwise, might be sufficient in certain embodiments. If, however, multiple points of interest exist in the city, a more accurate estimated time of arrival may be desired. In certain embodiments, the location marketing system 130 may identify and present acceptable levels of accuracy to the adaptive location system 120 during, for example, the registration of the location marketing system 130 described above.

Figure 6:
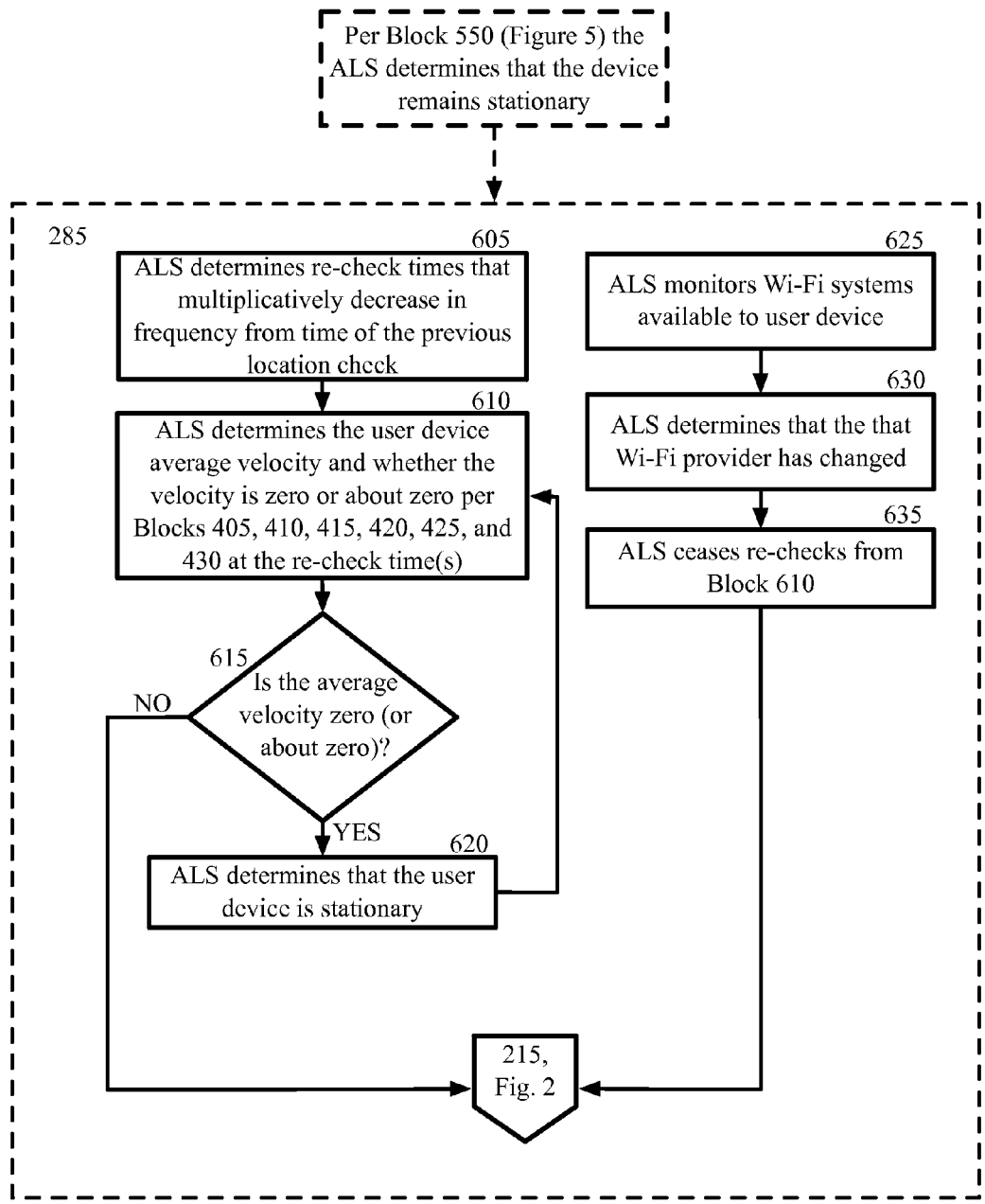
FIG. 6 is a block flow diagram depicting parallel methods for determining whether a user device moves, in accordance with certain example embodiments.

FIG. 6 is a block flow diagram depicting parallel methods for determining whether a user device moves, in accordance with certain example embodiments. For example, if the adaptive location system 120 determines in Block 525 that the user device 110 remains stationary from the previous average velocity check, the adaptive location system 120 monitors the user device for movement as detailed in FIG. 6. To monitor whether the user device moves, in certain embodiments the adaptive location system 120 relies on one or both of re-checking the velocity of the user device 110 and using Wi-Fi® scans to detect whether the user device 110 has moved. Because continuously checking a user device location and/or velocity at repeated intervals (such as every 5 minutes, for example) is battery intensive, re-checking the average velocity of the user device 110 at specified times (rather than continuously, for example) is less battery intensive and hence preserves battery charge. Similarly, monitoring whether a user device Wi-Fi provider has changed, as in indication that the user device 110 has moved, is less battery intensive continuously checking a user device location and/or velocity.

With reference to FIGS. 1 and 2, in block 605 of method 285, once the adaptive location system 120 determines user device 110 is still stationary (i.e., a velocity of zero or about zero as determined in block 525), the adaptive location system 120 determines configurable re-check times that decrease in frequency from the time of the previous location check of the user device 110. In certain example embodiments, the adaptive location system 120 determines configurable re-check times that multiplicatively decrease in frequency from the time of the previous location check of the user device 110. For example, the adaptive location system 120 may determine one or more re-check times based on an exponential back-off from the time of the previous device velocity check, such as at 2, 4, 8, 16, etc. minutes from the time of the previous device velocity check. In certain example embodiments, a configurable limit may be placed on the re-check time, whereby the adaptive location system may be configured to wait not longer than an hour, for example, before checking the average velocity of the user device. For example, the adaptive location system 120 may determine re-check times at 2, 4, 8, 16, 32, and 60 minutes and thereafter every 60 minutes, depending on the re-check configuration. In another example embodiment, the configurable limit is set at 30 minutes. That is, the maximum time that the adaptive location system will wait before re-checking the user device 110 is, in certain embodiments, 30 minutes.

In block 610, at the one or more re-check times as detailed in block 605, the adaptive location system 120 determines the average user velocity of the user device 110 and whether that velocity is zero or about zero. For example, the adaptive location system 120 uses the method detailed in blocks 405, 410, 415, 420, 425, and 430 to determine the average user velocity of the user device 110 and whether that velocity is zero or about zero. If the adaptive location system 120 determines that the average velocity of the user device 110 is zero or about zero, the method follows the "YES" branch of block 615 to block 620. If the adaptive location system 120 determines that the average velocity of the user device 110 is not zero or not about zero, the method follows the "NO" branch of block 615 to block 215 as described below.

In block 620, the adaptive location system 120 determines that the user device 110 is stationary. For example, based on the determination that the average velocity of the user device 110 is zero or about zero, the adaptive location system 120 determines that the user device is stationary. The adaptive location system 120 then re-checks the average velocity of the device at the next re-check time. The adaptive location system 120 repeats the re-check cycle until the adaptive location system 120 determines that the user device is not stationary or that the user device has otherwise moved, for example.

Once the adaptive location system determines that the user device is not stationary, the method follows to back to block 215, wherein the adaptive location system 120 determines the location of the user device 110. In certain example embodiments, because in blocks 610 and 615 the adaptive location system determined, at a re-check time, an average velocity of the user device 110 and that the user device 110 was moving, the method follows from block 215 directly to the "NO" branch of block 225 to block 230. That is, in certain example embodiments, the adaptive location system 120 does not have to determine whether the user device 110 is moving or stationary as detailed in block 220 (because it has already done so at a re-check time as detailed in blocks 610 and 615).

In block 625, alternatively or in addition to the method detailed in blocks 605, 610, 615, and 620, the adaptive location system 120 monitors Wi-Fi systems available to the user device 110. For example, the operating system of many user devices is configured to scan, at regular intervals, Wi-Fi signals that are available to the user device. In one example embodiment, the adaptive location system 120, such as via the adaptive location application 112 on the user device 110, registers to receive the results of the Wi-Fi scan whenever the operating system of the user device 110 completes a Wi-Fi scan. For example, the adaptive location system 120 may register a broadcast receiver with the operating system of the user device 110 so that the adaptive location system 120 may receive and monitor the Wi-Fi scan results from avail Wi-Fi hotspots. Alternatively or additionally, the adaptive location system 120 may use a post-delay handler to periodically request a Wi-Fi scan if there has been no scan within a configurable time limit. For example, if the adaptive location system 120 may request scan results of Wi-Fi hotspots at every 5 minutes.

In block 630, the adaptive location system 120 determines that the Wi-Fi provider available to the user device 110 has changed. For example, whenever new Wi-Fi scan results are available from the operative system of the user device 110, the adaptive location system will receive those Wi-Fi scan results from the user device 110. The adaptive location system 120 then determines, based on those results, whether the Wi-Fi provider has changed by comparing recent Wi-Fi scan results with a previous Wi-Fi scan results.

In certain example embodiments, because the scan results may contain the media access control ("MAC") address of each Wi-Fi hotspot detected, the adaptive location system 120 monitors MAC addresses to determine if the Wi-Fi provider has changed. For example, in one embodiment, a single change in an available MAC address between the current scan results and a previous scan results may be sufficient for the adaptive location system 120 to determine that the Wi-Fi provider has changed. Alternatively, the adaptive location system 120 may rely on comparing a plurality of MAC addresses. For example, the adaptive location system 120 compares the current scan results with the previous scan results. If, for example, a significant percentage (such as more then about 60%) of the MAC addresses of the current scan results are present in the previous scan results, the adaptive location system 120 determines that there has not been a significant change in the in the MAC addresses and that hence the Wi-Fi provider has changed. Alternatively, if the adaptive location system 120 determines, for example, that less than about 60% of the MAC addresses in the current scan results are the same as those from the previous scan results, the adaptive location system 120 determines that there has been a significant change in the in the MAC addresses and that hence the Wi-Fi provider has changed.

In block 635, once adaptive location system 120 determines that the Wi-Fi provider has changed, the adaptive location system 120 may, in certain embodiment, cease the multiplicative re-checks detailed in block 605, 610, 615, and 620 in order to, for example, reduce battery usage and hence preserve battery charge. In other embodiments, the adaptive location system 120 may maintain the multiplicative re-checks detailed in block 605, 610, 615, and 620. From block 635, the method follows to block 215.

Alternatively or additionally, to determine whether the user device 110 has moved, the adaptive location system 120 may compare each of the recent locations from the location determinations in block 405 with the locations of the user device 110 at a previous location determination. If, based on the comparison, for example, the distance the user device 110 has moved is small, then the adaptive location system 120 determines that the user device 110 is stationary. If the distance the user device 110 has moved is large, the adaptive location system 120 determines that the user device 110 has moved. In certain embodiments, whether the distance is small or large, for example, is configurable and is based on the accuracy of the location determinations. That is, if the accuracy of the location determination is 50 meters and the distance between the locations is at or less than 50 meters, for example, the adaptive location system 120 would determine that the user device is stationary. Alternatively, if the if the accuracy of the location determination is 50 meters and the distance between the locations is greater than 50 meters (such as 100 meters, for example), the adaptive location system 120 would determine that the user device 110 has moved.

Other Example Systems

Figure 7:
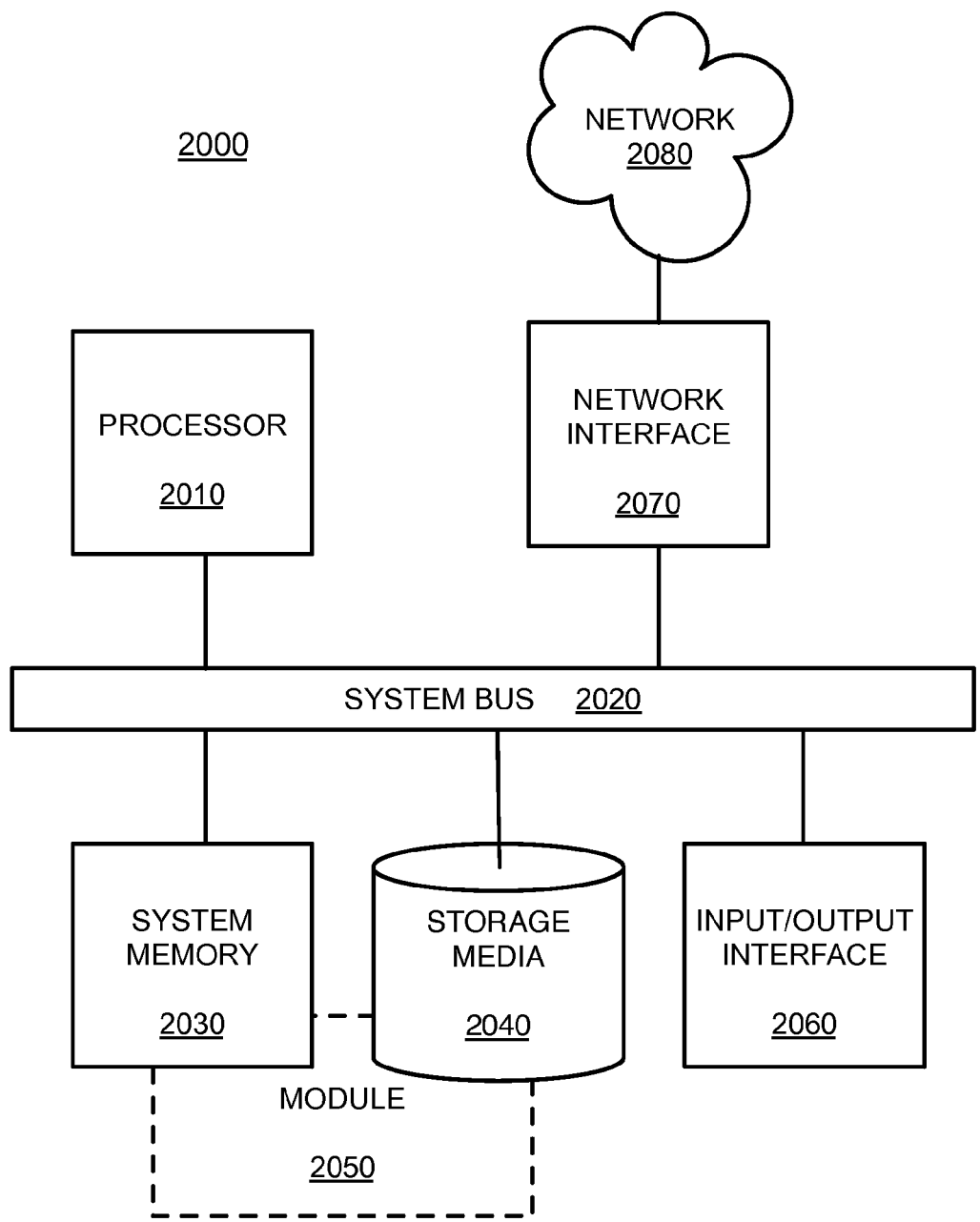
FIG. 7 is a block diagram depicting a computer machine and module, in accordance with certain example embodiments.

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a Smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method for location determination, comprising:

determining, using one or more computing devices, a location of a user computing device relative to a location of a point of interest;

determining, using the one or more computing devices, whether the user device is moving or stationary by determining a velocity of the user device and determining whether the velocity of the user device is at or below a predetermined minimum threshold;

when the user device is determined to be stationary based on a determination that the velocity of the user device is at or below the predetermined minimum threshold, associating, using the one or more computing devices, an assigned velocity with the user device, wherein the assigned velocity is a predetermined velocity that is associated with the user device in response to determining that the user device is stationary, determining, using the one or more computing devices, an estimated time of arrival to the point of interest based at least in part on the assigned velocity associated with the user device, and, monitoring, using the one or more computing devices, at a later time that is based at least in part on a function of the estimated time of arrival, for movement of the user device, movement of the user device resulting in re-determining the location of the user device relative to the location of the point of interest; alternatively, wherein, when the user device is determined to be moving based on a determination that the velocity of the user device is above the predetermined minimum threshold, matching, using the one or more computing devices, the velocity of the user device with a predetermined moving velocity, wherein the predetermined moving velocity is based at least in part on the determined velocity of the user device, determining, using the one or more computing devices, the estimated time of arrival to the point of interest based at least in part on the predetermined moving velocity matched to the user device, and, verifying, using the one or more computing devices, at the later time that is based at least in part on a function of the estimated time of arrival, the estimated time of arrival to the point of interest based at least in part on the predetermined moving velocity matched to the user device.

2. The computer-implemented method of claim 1, wherein the monitoring for the movement of the user device comprises:

monitoring, using the one or more computing devices, a velocity of the user device based at least in part on determining, using the one or more computing devices, a plurality of re-check times that decrease in frequency from a time associated with a previous location check, and determining, using the one or more computing devices, the velocity of the user device at each re-check time subsequent to a time associated with a previous location check until the velocity determined at a particular re-check time determines that the user device is moving.

3. The computer-implemented method of claim 1, wherein the monitoring for the movement of the user device further comprises:

monitoring, using the one or more computing devices, Wi-Fi wireless local area network (WLAN) results scans of the user device by receiving, using the one or more computing devices, a first Wi-Fi results scan from the user device, receiving, using the one or more computing devices, a second Wi-Fi results scan from the user device, comparing, using the one or more computing devices, the first Wi-Fi results scan with the second Wi-Fi results scan, wherein a change in the Wi-Fi results determines that the user device has moved.

4. The computer-implemented method of claim 3, wherein the monitoring of the Wi-Fi results scans of the user device further comprises monitoring at least one media access control ("MAC") address on the user device.

5. The computer-implemented method of claim 1, wherein determining whether the user device is moving or stationary by determining a velocity of the user device further comprises:

making, using the one or more computing devices, a series of location determinations of the user device;

determining, using the one or more computing devices, a distance between each location in the series of locations;

determining, using the one or more computing devices, an elapsed time between each serial location determination;

determining, using the one or more computing devices, a plurality of velocities of the user device, wherein each of the plurality of velocities is determined between each serial location based on the distance between each serial location determination and the elapsed time between each corresponding serial location determination; and, determining, using the one or more computing devices, the velocity of the user device based on the determination of the plurality of velocities, wherein, the velocity of the user device determines whether the user device is moving or stationary.

6. The computer-implemented method of claim 1, wherein determining the estimated time of arrival to the point of interest comprises:

determining, using the one or more computing devices, a length of time to arrival at the point of interest based on a preliminary estimated time of arrival;

determining, using the one or more computing devices, a plurality of re-check times based on a fraction of the length of time to arrival at the point of interest;

determining, using the one or more computing devices, the velocity of the user device at a re-check time;

matching, using the one or more computing devices, the velocity of the user device at the re-check time to the predetermined moving velocity; and, determining, using the one or more computing devices, a secondary estimated time of arrival to the point of interest based on the velocity of the user device at the re-check time.

7. The computer-implemented method of claim 1, wherein the location of the point of interest comprises a zone boundary around a latitude and longitude of the location of the point of interest.

8. The computer-implemented method of claim 1, wherein the method further comprises invoking an application on the user device at the estimated time of arrival.

9. The computer-implemented method of claim 8, wherein the application on the user device presents an alert on the user device regarding the point of interest.

10. The method claim 1, further comprising:

when the user device is determined to be stationary, monitoring, using the one or more computing devices, the velocity of the user device based at least in part on determining, using the one or more computing devices, a plurality of re-check times that decrease in frequency from a time associated with a previous location check, and determining, using the one or more computing devices, the velocity of the user device at each re-check time subsequent to a time associated with a previous location check until the velocity determined at a particular re-check time determines that the user device is moving.

11. The computer-implemented method of claim 10, wherein the monitoring for the movement of the user device comprises:

monitoring, using the one or more computing devices, Wi-Fi results scans of the user device by receiving, using the one or more computing devices, a first Wi-Fi results scan from the user device, receiving, using the one or more computing devices, a second Wi-Fi results scan from the user device, comparing, using the one or more computing devices, the first Wi-Fi results scan with the second Wi-Fi results scan, wherein a change in the Wi-Fi results determines that the user device has moved.

12. The computer-implemented method of claim 10, wherein the monitoring of the Wi-Fi results scans of the user device further comprises monitoring at least one media access control ("MAC") address on the user device.

13. A system to determine the location of a user device, the system comprising:
- a storage device;
- a processor communicatively coupled to the storage device, wherein the processor executes application code instructions that are stored in the storage device to cause the system to:
- determine a location of a user computing device relative to a location of a point of interest;
- determine whether the user device is moving or stationary by determining a velocity of the user device and determining whether the velocity of the user device is at or below a predetermined minimum threshold;
- when the user device is determined to be stationary,
  - associate an assigned velocity with the user device, wherein the assigned velocity is a predetermined velocity that is associated with the user device in response to determining that the user device is stationary,
  - determine an estimated time of arrival to the point of interest based at least in part on the assigned velocity associated with the user device, and,
  - monitor the user device for movement, the movement of the user device resulting in re-determining the location of the user device relative to the location of the point of interest; alternatively,
- wherein, when the user device is determined to be moving,
  - match the velocity of the user device with a predetermined moving velocity, wherein the predetermined moving velocity is based at least in part on the determined velocity of the user device,
  - determine the estimated time of arrival to the point of interest based at least in part on the predetermined moving velocity matched to the user device, and,
  - verify, at the later time that is based at least in part on a function of the estimated time of arrival, the estimated time of arrival to the point of interest based at least in part on the predetermined moving velocity matched to the user device.

14. The system of claim 13, wherein the determining whether the user device is moving or stationary by determining a velocity of the user device further comprises:
- monitoring a velocity of the user device based at least in part on
  - determining a plurality of re-check times that decrease in frequency from a time associated with a previous location check, and
  - determining the velocity of the user device at each re-check time subsequent to a time associated with a previous location check until the velocity determined at a particular re-check time determines that the user device is moving.

15. The system of claim 13, wherein the monitoring for the movement of the user device further comprises:
- monitoring Wi-Fi wireless local area network (WLAN) results scans of the user device by
  - receiving a first Wi-Fi results scan from the user device,
  - receiving a second Wi-Fi results scan from the user device,
  - comparing the first Wi-Fi results scan with the second Wi-Fi results scan, wherein a change in the Wi-Fi results determines that the user device has moved.

16. The system of claim 15, wherein the monitoring of the Wi-Fi results scans of the user device further comprises monitoring at least one media access control ("MAC") address on the user device.

17. The system of claim 13, wherein determining whether the user device is moving or stationary by determining a velocity of the user device comprises:
- making, using the one or more computing devices, a series of location determinations of the user device;
- determining, using the one or more computing devices, a distance between each location in the series of locations;
- determining, using the one or more computing devices, an elapsed time between each serial location determination;
- determining, using the one or more computing devices, a plurality of velocities of the user device, wherein each of the plurality of velocities is determined between each serial location based on the distance between each serial location determination and the elapsed time between each corresponding serial location determination; and,
- determining, using the one or more computing devices, the velocity of the user device based on the determination of the plurality of velocities,
- wherein, the velocity of the user device determines whether the user device is moving or stationary.

18. The system of claim 13, wherein determining the estimated time of arrival to the point of interest comprises:
- determining, using the one or more computing devices, a length of time to arrival at the point of interest based on a preliminary estimated time of arrival;
- determining, using the one or more computing devices, a plurality of re-check times based on a fraction of the length of time to arrival at the point of interest;
- determining, using the one or more computing devices, the velocity of the user device at a re-check time;
- matching, using the one or more computing devices, the velocity of the user device at the re-check time to the predetermined moving velocity; and,
- determining, using the one or more computing devices, a secondary estimated time of arrival to the point of interest based on the velocity of the user device at the re-check time.

19. The system of claim 13, wherein the location of the point of interest comprises a zone boundary around a latitude and longitude of the location of the point of interest.

20. The system of claim 13, wherein the method further comprises invoking an application on the user device at the estimated time of arrival.

21. A computer program product, comprising:
- a non-transitory computer-executable storage device having computer-readable program instructions embodied thereon that when executed by a computer cause the computer to perform location determinations, the computer-executable program instructions comprising:
  - computer program instructions to determine a location of a network user computing device relative to a location of a point of interest;
  - computer program instructions to determine whether the user device is moving or stationary by determining a velocity of the user device and determining whether the velocity of the user device is at or below a predetermined minimum threshold;
  - when the user device is determined to be stationary,
    - computer program instructions to associate an assigned velocity with the user device, wherein the assigned velocity is a predetermined velocity that is associated with the user device in response to determining that the user device is stationary, computer program instructions to determine an estimated time of arrival to the point of interest based at least in part on the assigned velocity associated with the user device, computer program instructions to monitor the user device for movement, movement of the user device resulting in re-determining the location of the user device relative to the location of the point of interest; alternatively, wherein, when, the user device is determined to be moving, computer program instructions to match the velocity of the user device with a predetermined moving velocity, wherein the predetermined moving velocity is based at least in part on the determined velocity of the user device, computer program instructions to determine the estimated time of arrival to the point of interest based at least in part on the predetermined velocity matched to the user device, and, computer program instructions to verify at the later time that is based at least in part on a function of the estimated time of arrival, the estimated time of arrival to the point of interest based at least in part on the predetermined moving velocity matched to the user device.

22. The computer program product of claim 21, wherein the determining whether the user device is moving or stationary by determining a velocity of the user device further comprises:

monitoring a velocity of the user device based at least in part on
determining a plurality of re-check times that decrease in frequency from a time associated with a previous location check, and
determining the velocity of the user device at each re-check time subsequent to a time associated with a previous location check until the velocity determined at a particular re-check time determines that the user device is moving.

23. The computer program product of claim 21, wherein the monitoring for the movement of the user device further comprises:

monitoring Wi-Fi wireless local area network (WLAN) results scans of the user device by
receiving a first Wi-Fi results scan from the user device,
receiving a second Wi-Fi results scan from the user device,
comparing the first Wi-Fi results scan with the second Wi-Fi results scan, wherein a change in the Wi-Fi results determines that the user device has moved.

* * * * *